United States Patent
Rao et al.

(10) Patent No.: US 7,127,465 B2
(45) Date of Patent: Oct. 24, 2006

(54) MEMORY-EFFICIENT METADATA ORGANIZATION IN A STORAGE ARRAY

(75) Inventors: Raghavendra J Rao, Fremont, CA (US); Whay Sing Lee, Newark, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 410 days.

(21) Appl. No.: 10/261,545

(22) Filed: Sep. 30, 2002

(65) Prior Publication Data

US 2004/0064463 A1    Apr. 1, 2004

(51) Int. Cl.
*G06F 17/30* (2006.01)

(52) U.S. Cl. .......................... 707/100; 711/162; 711/202

(58) Field of Classification Search ................. 707/100; 711/203, 124, 202
See application file for complete search history.

(56) References Cited

U.S. PATENT DOCUMENTS

| | | | |
|---|---|---|---|
| 6,044,367 A | * | 3/2000 | Wolff .............................. 707/2 |
| 6,067,545 A | * | 5/2000 | Wolff ............................. 707/10 |
| 6,484,186 B1 | | 11/2002 | Rungta |
| 6,532,479 B1 | | 3/2003 | Souder et al. |
| 6,606,629 B1 | * | 8/2003 | DeKoning et al. .......... 707/100 |
| 6,898,688 B1 | * | 5/2005 | Martin et al. ................ 711/202 |
| 2003/0070036 A1 | * | 4/2003 | Gorobets ..................... 711/103 |
| 2003/0140210 A1 | * | 7/2003 | Testardi ....................... 711/203 |
| 2004/0062106 A1 | * | 4/2004 | Ramesh et al. ............. 365/202 |
| 2004/0078533 A1 | | 4/2004 | Lee |

OTHER PUBLICATIONS

"Sun StorEdge Instant Image Software Architecture Guide", Dec. 2001, 52 pgs.

* cited by examiner

*Primary Examiner*—Don Wong
*Assistant Examiner*—Sheree Brown
(74) *Attorney, Agent, or Firm*—Meyertons Hood Kivlin Kowert & Goetzel, P.C.; B. Noël Kivlin

(57) ABSTRACT

A metadata tree structure having a plurality of nodes (slabs), each node containing a MD table. Each of the MD tables has a plurality of entries. Each of the entries in the MD tables represents a contiguous range of block addresses and contains a pointer to a cache slot storing a date block corresponding to the block address, or an indicator to indicate that the corresponding data block is not stored in a NVRAM cache slot. Each MD table also contains a block address range indicator to indicate the contiguous range of block addresses, and at least one pointer to point to any parent or child nodes. In an alternative embodiment, the pointer of each MD entry may point to a disk address if the data is not in cache. For such an embodiment, portions of the MD store may be stored to disk.

27 Claims, 5 Drawing Sheets

MEMORY-EFFICIENT METADATA ORGANIZATION IN A STORAGE ARRAY

FIELD

Embodiments of the invention relate generally to the field of data storage and more particularly to an efficient structure for storing metadata (data pertaining to data).

BACKGROUND

A conventional data storage device contains an array of disk drives for data storage, a controller for controlling access to the disk array, and a cache memory. The cache memory is used for storing recently accessed data so as to provide quick access to data that is likely to be accessed in the near-term without having to access the disk on every occasion. When a data access request is received, the storage device first attempts to satisfy the request using the cache, before using the disk array. For example, when a READ operation is referencing data that is already in cache, the data will be returned directly from the cache. For WRITE operations, the data is written into the data cache, replacing previous versions of the same data, if any, within the cache. Since a particular file or block of data may be located on the disk or in the cache, the storage device typically includes Metadata (MD) that registers all data blocks currently in the cache and, therefore, indicates whether a data block is on the disk or stored in cache. If the data block is in the cache, the MD indicates where the data block is stored in the cache. The MD also indicates the current state of the data block (i.e., whether or not it has been "flushed" to disk).

Since fast access is required to both the data cache and the MD store, both are typically stored in random access memory (RAM). Because it is important that the data cache and the MD store not be lost in the event of an unexpected power failure, the RAM is typically non-volatile RAM (NVRAM). Because NVRAM is expensive, only a limited amount is available in a storage device. This means that the more NVRAM is used to store MD, the less is available for actual data.

Typically, the data cache is divided into fixed size 'slots', and the MD store is divided into fixed size 'entries'. In conventional design, there is typically a one-to-one matching between slots and entries. Typically the MD may be organized as a table with an implicit association (direct mapping) between the MD entries and the data cache slots. That is, each MD entry is statically associated to a particular data cache slot, and the data block relating to a MD entry is implicitly contained in the data block slot thus associated with the entry. Alternatively, the MD may be organized in a fully associative manner in which each MD entry in the table also includes a pointer to an arbitrary data cache slot. When a data access request for a particular data block is received at the storage device, the array controller looks in the MD structure to find an entry that contains the block address. The entry contains the pointer to the data cache slot containing the corresponding data block.

Such organization for the MD has a substantial drawback in that because the MD requires a fixed size (i.e., an entry for each data cache slot), the array controller cannot dynamically divide the NVRAM between the data cache and metadata according to application need.

The process of locating a given block address in the MD structure is typically done in one of the two ways. One is that, the controller simply searches through the MD table entries until it finds a match. This method may present performance problems because it may require searching a large number of MD entries. The other method of locating a given block address in the MD structure employs a hash function to map groups of block addresses into particular metadata entries. Each block address can be mapped to exactly one entry, but multiple addresses can be mapped to the same entry. A block address field within the entry determines the actual data block being represented by the entry. In the case where the hash function maps every block address to a different entry, a direct mapping results. The hash function approach can result in conflicts, where multiple heavily-used block addresses that happen to be mapped to the same MD entry keep forcing their corresponding data blocks to be evicted from the data cache (because the MD entry can only describe one particular data block at any time), even if there is plenty of free space left in the data cache. A direct-mapped hash function eliminates such conflicts, but can waste a lot of metadata store, since a entry must be reserved for each VBA at all times, regardless of whether it is ever used or not.

Typical storage devices divide a disk into a number of discrete storage areas known as virtual logical units (VLUs) each of which supports an independent virtual block address (VBA) space. Therefore every user data block in the array is uniquely identified by referenced to a particular VLU and a VBA. The MD structure must therefore include VLU information to be able to support such multi-VLU configurations.

This need may be facilitated by logically dividing the MD store into separate tables for each VLU. Given a block address (VLU#, VBA), the array controller performs the MD lookup in the appropriate partition of the MD store. However, partitioning the MD store can result in inefficient use of the NVRAM. For example, a busy VLU cannot make use of the MD entries (and, consequently, the one-to-one-matched data cache slots) allocated to idle VLU's.

Alternatively, the MD store need not be partitioned, but the entire MD store may be included in one table where each may represent any user data block from any VLU. In such case, the lookup function may be based on a combination of both the VLU# and VBA. If such an implementation employs a hash function, it may suffer from another kind of conflict where the same VBA from different VLUs force one another out of the cache.

SUMMARY

An embodiment of the present invention provides a MD tree structure comprising a plurality of nodes (slabs), each node containing a MD table. Each of the MD tables has a plurality of entries. Each of the entries in the MD table represents a contiguous range of block addresses and contains a pointer to a random access memory slot storing a data block corresponding to the block address, or an indicator to indicate that the corresponding data block is not stored in a random access memory slot. Each MD table also contains a block address range indicator to indicate the continuous range of block address, and at least one pointer to point to any parent or child nodes.

Other features and advantages of embodiments of the present invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings.

DETAILED DESCRIPTION

Overview

Figure 1:
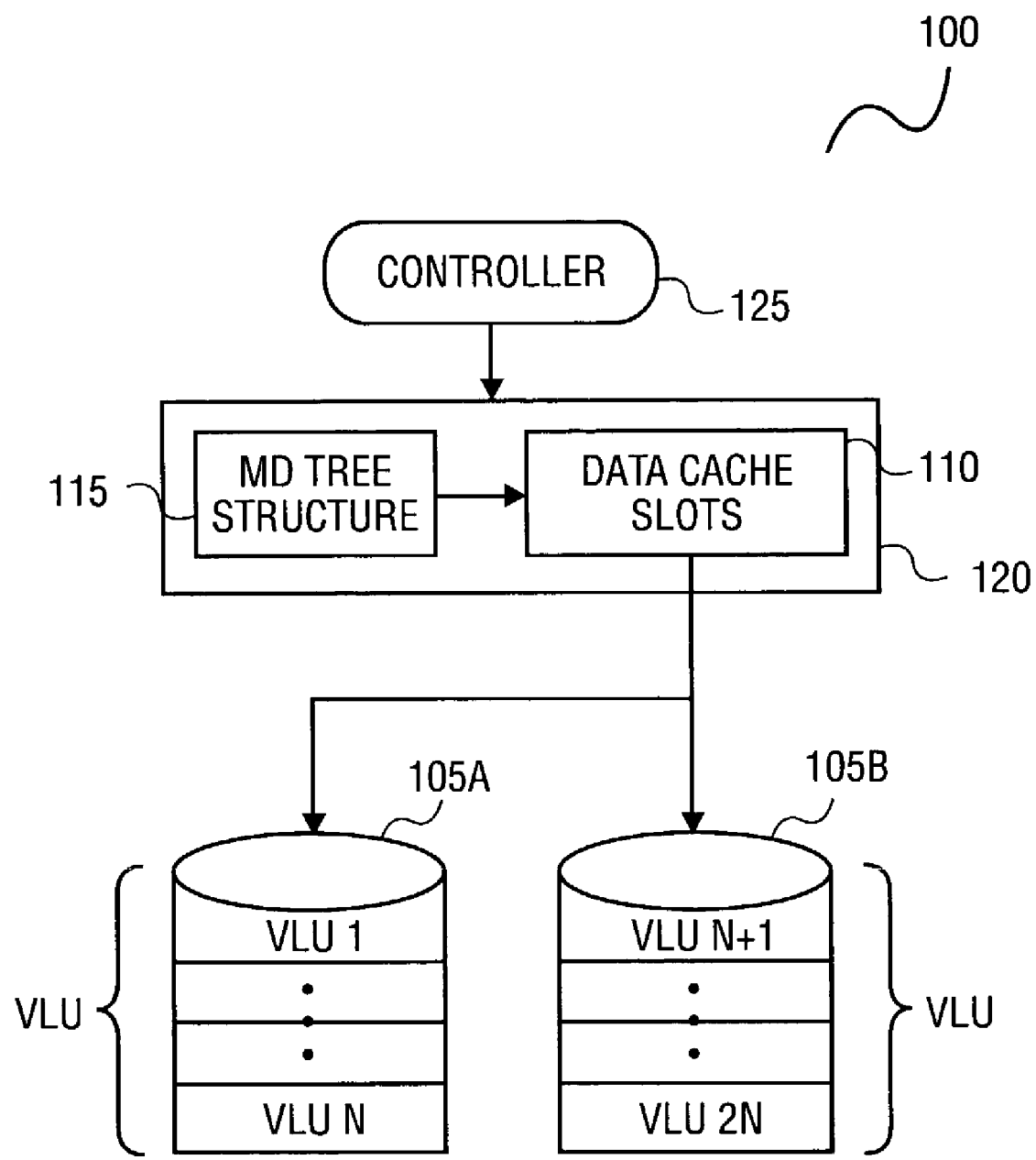
FIG. 1 illustrates a storage device having a MD tree structure in accordance with one embodiment of the present invention.

An embodiment of the present invention provides a MD tree structure having a plurality of nodes (slabs), each node containing a MD table. Each of the MD tables has a plurality of entries. Each of the entries in the MD table represents a contiguous range of block addresses and contains a pointer to a cache slot storing a data block corresponding to the block address, or an indicator to indicate that the corresponding data block is not stored in a NVRAM cache slot. Each MD table also contains a block address range indicator to indicate the contiguous range of block addresses, and at least one pointer to point to any parent or child nodes.

In an alternative embodiment, the pointer of each MD entry may point to either a cache slot or a disk address depending on whether the data is in cache or on disk. For such an embodiment, portions of the MD store that are used relatively infrequently may be stored to disk.

In one embodiment, the size of each cache slot is an integral multiple of the size of each MD slab. Such organization allows for a dynamic and efficient allocation of the NVRAM between the data cache and the MD store.

In one embodiment, a MD tree structure is created for each VLU to avoid conflicting MD entries. In such an embodiment, the MD store need not be statically partitioned among the VLUs thus allowing efficient use of the NVRAM.

An intended advantage of one embodiment of the present invention is to reduce MD search time through use of a MD tree structure allowing a logarithmic (as opposed to linear) MD search. Another intended advantage of one embodiment of the present invention is reduce MD search time by including a contiguous range of block addresses in each slab thereby allowing a simple offset of the slab's block address range to locate the desired block addresses. Another intended advantage of one embodiment of the present invention is to provide for the dynamic adjustment of the MD slab size and/or the number of MD slabs installed in the MD tree structure (and hence the amount of NVRAM allocated for MD storage) to allow efficient allocation of NVRAM between the MD and the cache.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

FIG. 1 illustrates a storage device having a MD tree structure in accordance with one embodiment of the present invention. Storage device 100 shown in FIG. 1 includes a number of storage disks shown as storage disks 105A and 105B. Each storage disk may be partitioned into a number of VLUs. For example, storage disk 105A is partitioned into VLUs 1 through n, and storage disk 105B is partitioned into VLUs n+1 through 2n. The storage disks are coupled to cache 110, which is located in NVRAM 120. Also located in NVRAM 120 is the MD tree structure 115 of the present invention. Controller 125 is coupled to the data cache 110 and to the MD tree structure 115, and through these to the storage disks. The MD tree structure contains a number of nodes where each node is a slab containing a fixed number of MD entries, pointers to parent or child slabs, and the range of block addresses that the slab represents.

Metadata Tree Structure Organization

Figure 2A:
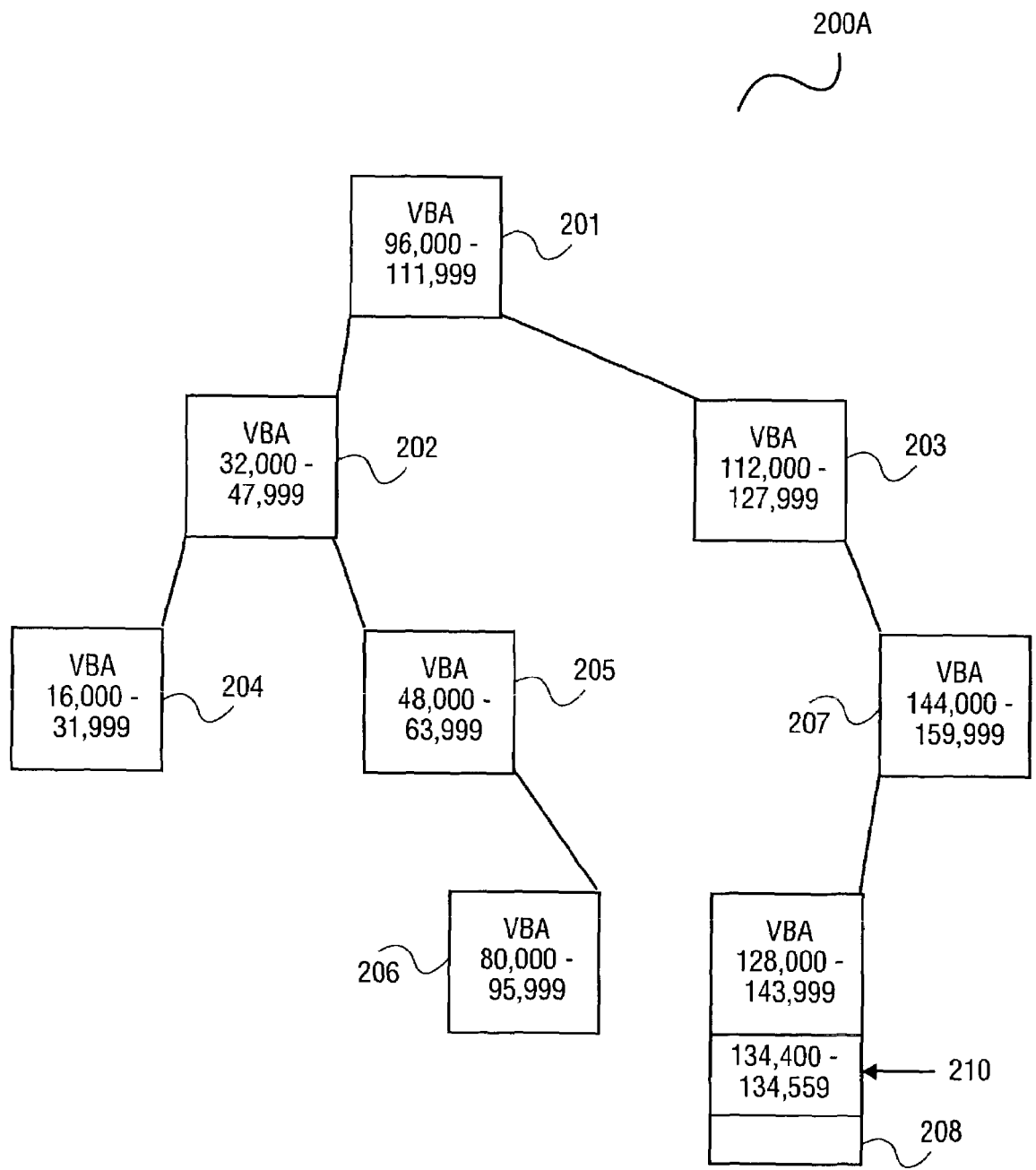
FIGS. 2A and 2B illustrate a MD structure organized as a tree of slabs in accordance with embodiments of the present invention.

FIG. 2A illustrates a MD structure organized as a tree of MD slabs in accordance with one embodiment of the present invention. In one embodiment, as each VLU is created within a storage disk, a new MD tree structure is created starting with a root slab. Initially the structure would be vacant, but as data pertaining to the particular VLU is added, the tree is created. MD tree structure 200A is an "in-progress" tree that illustrates various features of a MD tree structure for one embodiment. MD tree structure 200A includes slabs 201–208 each of which is a MD slab representing a standard size region of NVRAM that encompasses a specified contiguous range of VBAs. The size of each slab may be related to the cache line size. For example, for a system having a cache line with a capacity of 8 K bytes (i.e., sixteen 512-byte blocks), a slab with 1000 entries having an addressing capability of 8 M bytes may be implemented. That is, each of the 1000 entries in the slab addresses one cache line containing sixteen 512-byte blocks. Each MD slab of MD tree structure 200A has a range of 16,000 VBAs. Each MD slab contains the MD entries for the specified range, for example, in a sequential or directly-addressable manner, as described above, in which each MD entry in the table also includes a pointer to an arbitrary data cache slot. For example, for a slab having 16,000 VBAs, the VBA 32,050 is represented by the fourth MD entry within the MD slab having a VBA range on 32,000–47,999. The specific data block corresponding to VBA 32,050 is stored in the third data block in the cache slot located via the MD entry.

The MD tree structure, in accordance with one embodiment, is organized using conventional search-tree properties. For example, the VBA range represented by a slab's left child is always lower then the range of the slab itself, and the VBA range represented by the slab's right child is always higher then that of the slab itself. As shown in FIG. 2A, slab 201 has VBA range 96,000–111,999, while its left child slab, slab 202 has a lower range (i.e., 32,000–47,999) and its right child slab, slab 203 has a higher range (i.e., 112,000–127,999).

Figure 3:
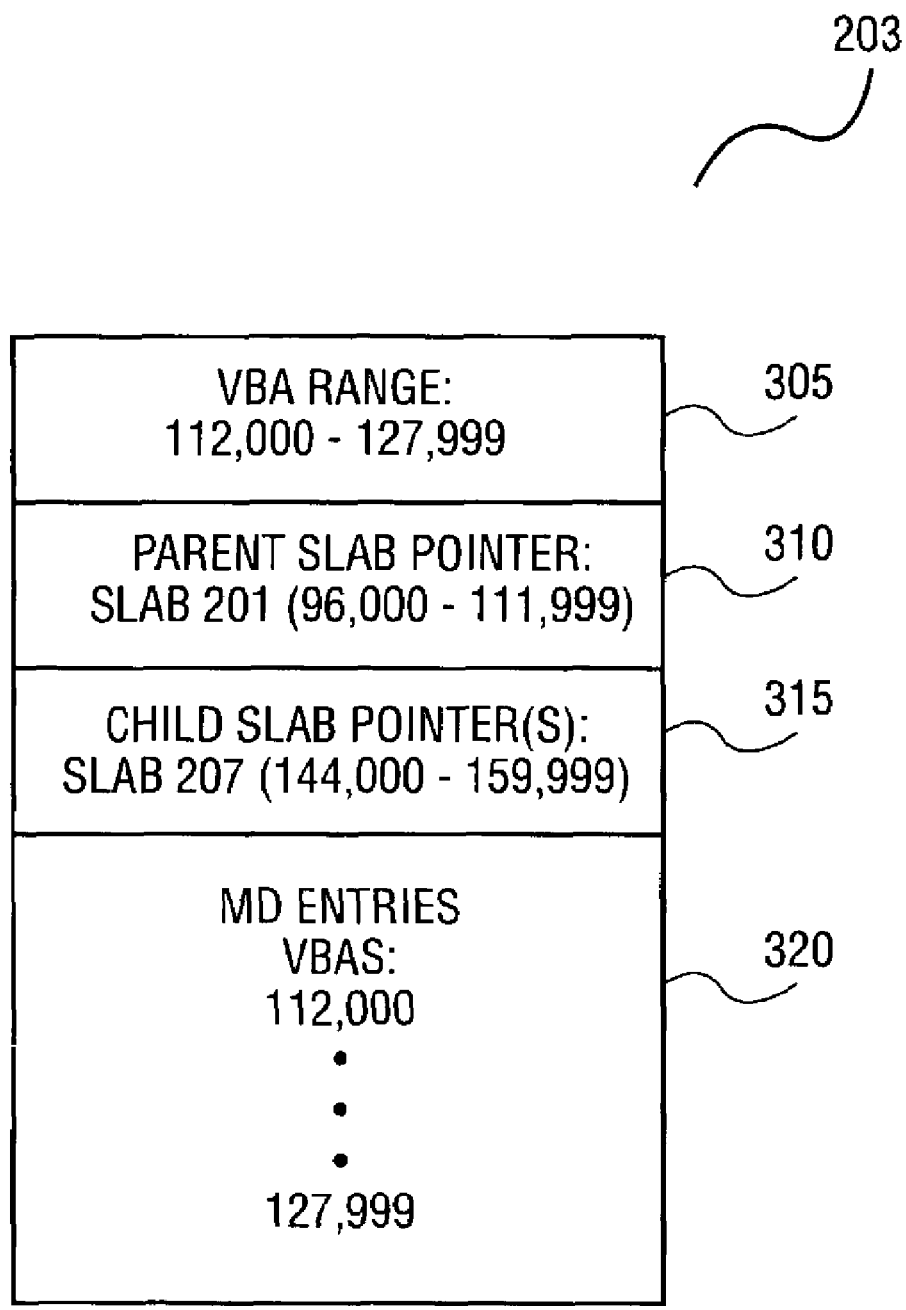
FIG. 3 illustrates the contents of each slab of a MD tree structure in accordance with one embodiment.

FIG. 3 illustrates the contents of each slab of MD tree structure 200A in accordance with one embodiment. For example, FIG. 3 illustrates the contents of slab 203. Each slab contains a VBA range 305 and a parent slab pointer 310. Each slab may also contain one or more child slab pointers 315. Note: If no child exists, the child slab pointer would be null. Each slab also contains MD entries 320. For example, the VBA range 305 for slab 203 is 112,000–127,999; the parent slab pointer 310 points to slab 201 and indicates the range of slab 201 as 96,000–111,999; the child slab pointer 315 points to slab 207, and indicates a range of 144,000–159,999; and the MD entries 320 include the MD entries for VBAs 112,000–127,999.

The MD tree structure of the present invention decreases the MD search time in several ways. For example, because the MD is organized as a tree, the search is logarithmic (as opposed to the linear search of a conventional MD table). For example, referring again to FIG. 2A, suppose the MD search is for a range of VBAs starting with VBA 134,400 through VBA 134,559. Then starting at root slab 201, of MD tree structure 200A, the range is checked. Since the VBA range of interest is in a higher range, the search proceeds to the right child of the root slab (i.e., slab 203) and its range is checked. Since the VBA range of interest is in a higher range, the search proceeds to the right child of slab 203, namely, slab 207, and its range is checked. Slab 207 has a range of 144,000–159,999. Since the VBA range of interest is included in a lower range, the search proceeds to the left child of slab 207, namely slab 208. The range of slab 208 is 128,000–143,999, which includes the VBA range of interest. Therefore, the organization of the MD entries in a MD tree structure renders a search of all the MD entries unnecessary. Moreover, the MD tree structure of the present invention need not be as large as a conventional MD table, as it need only contain slabs that encompass actual cache slots and not all potential cache slots.

A further way in which the MD tree structure of the present invention reduces MD search time is that the MD entries represent a contiguous range of VBAs. This means that once the slab representing the corresponding VBA range is found, an offset within the slab can be calculated and the corresponding range of VBAs retrieved. For example, once slab 208, containing the VBA range of interest 134,400–134,559 has been determined, it is further determined that VBAs 134,400–134,559 are represented by entries 401 through the 410 (i.e., entries 210) of slab 208. The MD of these entries are then retrieved. The MD entries contain either a pointer to a data cache slot containing the requested data block, or an indication that the requested data block is currently not in the data cache.

Slab Insertion/Deletion

Figure 2B:
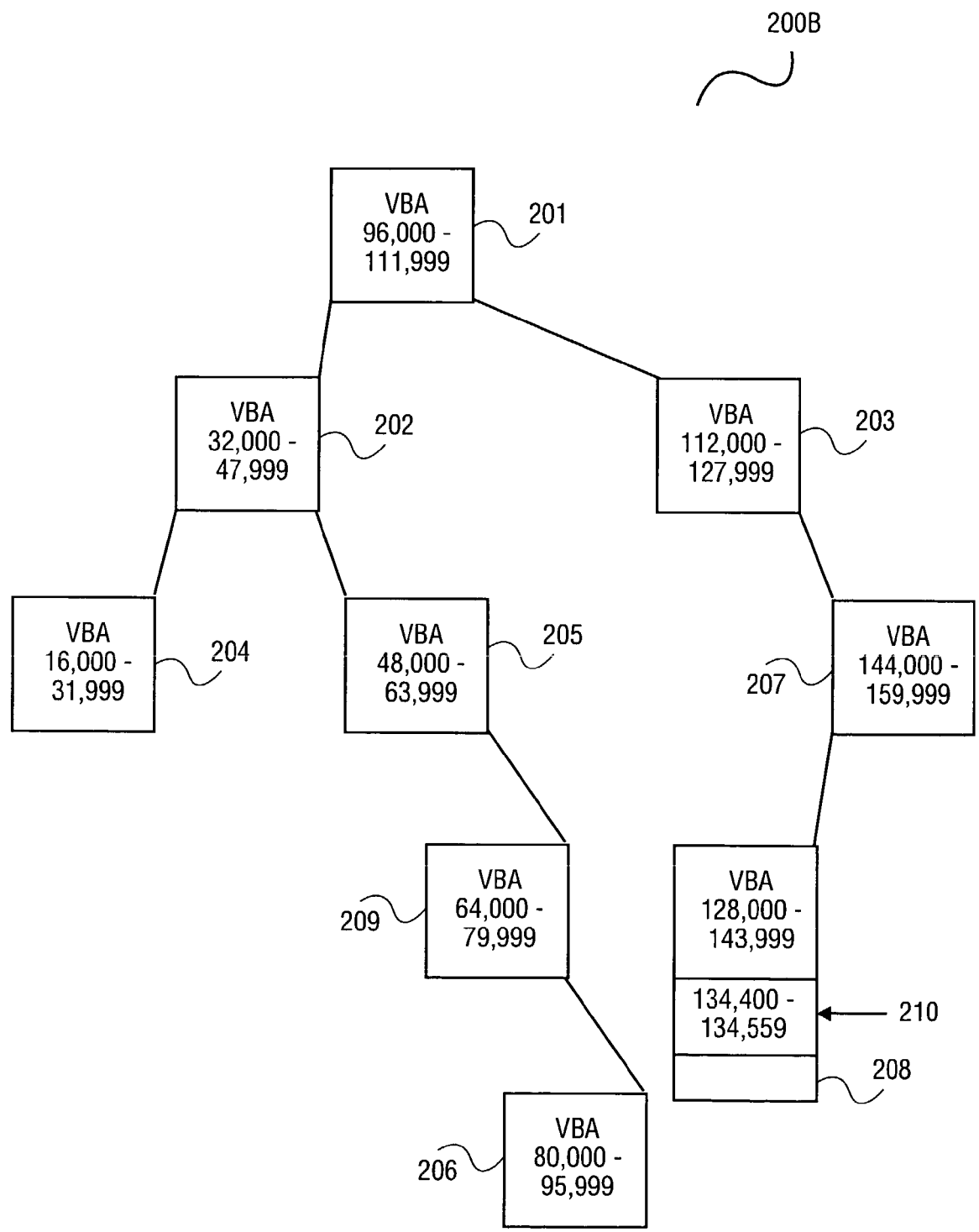

FIG. 2B illustrates the addition of a MD slab to the MD tree structure in accordance with one embodiment. If a MD search is conducted for a range of VBAs that is not in the data cache, the search will not yield a corresponding MD slab. For example, referring again to FIG. 2A, a MD search for a VBA range of 67,200–67,520 will not yield a corresponding MD slab because none of the MD slabs within MD tree structure 200A contain this range of VBAs. At this point, if the array controller decides to bring the data block into cache (in the case of a READ operation, or allow the requestor to deposit data into cache in the case of a WRITE), it allocates a new slab. MD tree structure 200B includes slab 209, which has been inserted into the MD tree structure in response to a data access request. Slab 209 has a range of 64,000–79,999, which includes the VBA range of interest.

Once the new slab is added to the tree structure, it is initialized with the appropriate VBA range, parent/child pointers, and MD entries. The slab is then linked into the proper location in the tree of slabs. For example, slab 209 has a higher range than that of slab 205, and therefore it could be inserted as a right child to slab 205. Since slab 209 has a lower range than that of slab 206, slab 209 could instead be inserted as a left child of slab 206. Alternatively, the entire MD tree structure may be reconfigured to provide a "balanced" tree structure, with four slabs branching to the left of the root slab and four slabs branching to the right of the root slab.

The controller may then allocate a data cache slot for the requested data block, and place the corresponding pointers into the MD entries at the appropriate offset within the newly allocated MD slab. Note that a slab need not always be fully populated. Some of the entries in a slab may contain a NULL pointer. In that case, the corresponding VBA is not currently in the cache. The controller may allocate a data cache slot and fetch the corresponding data block from disk (or accept it from a host WRITE command), and then fill the entry with the cache slot pointer.

MD slabs containing VBAs for data that is no longer stored in cache may be deleted from the MD tree structure. In one embodiment, such deletions result in a reorganization of the MD tree structure in order to maintain a balanced tree structure.

Dynamic Allocation of NVRAM

The amount of NVRAM allocated for the MD tree structure, and hence, the amount remaining for the data cache, may be determined based upon system requirements and data access patterns. For example, as noted above, in one embodiment, the size of a data cache slot is chosen to be an integral multiple of the size of a metadata slab. This provides the ability to dynamically allocate the use of NVRAM between the data cache and MD tree structure in response to system requirements. That is, a region of NVRAM can be used either as one data cache slot, or several metadata slabs, as the request traffic changes. Note that there is no longer a strict one-to-one match between metadata entries and data cache slots. Rather, there is only a one-to-one match between valid metadata entries and actually used data cache slots. Therefore, any available free slots in the NVRAM can be used by any VLU.

Figure 4:
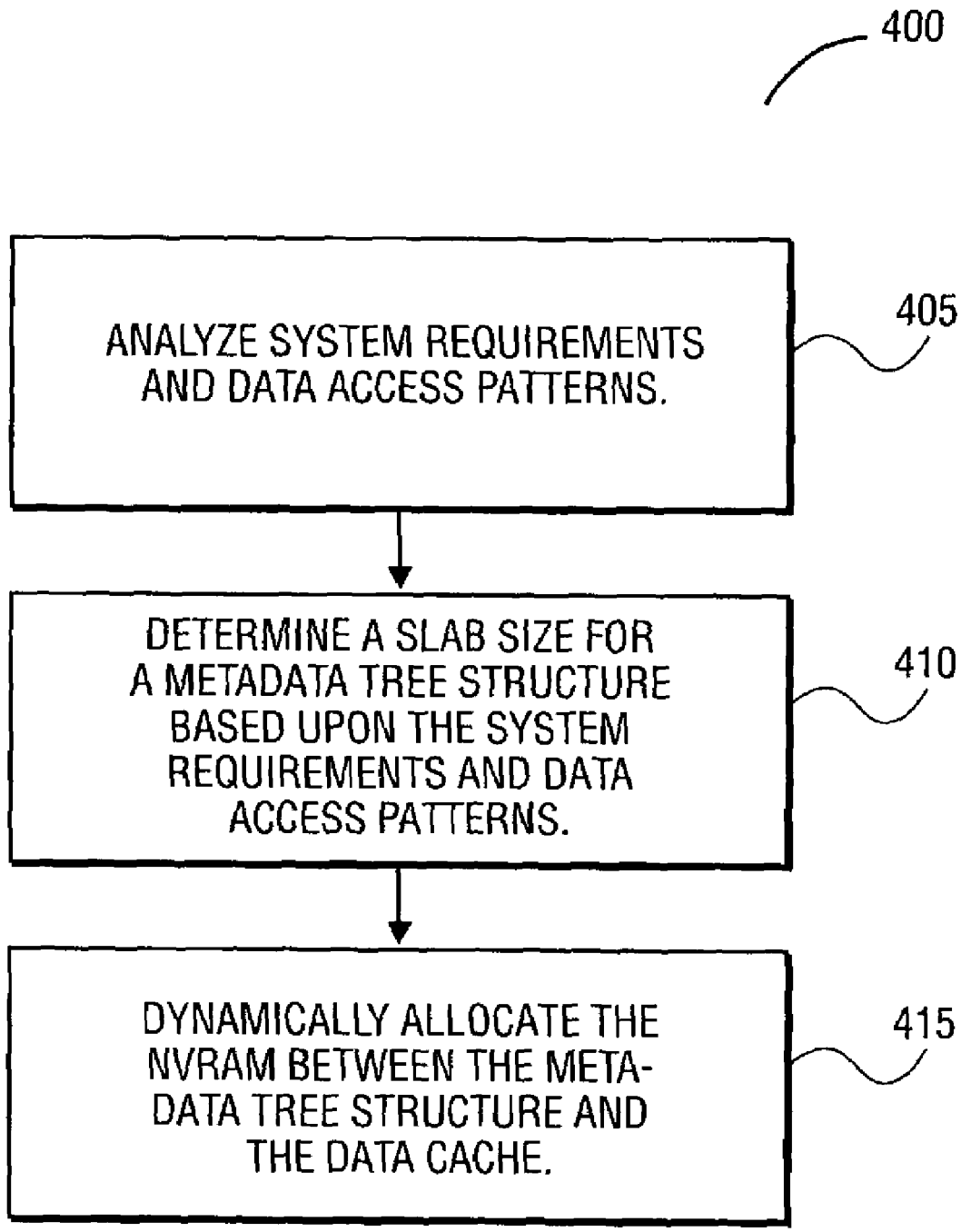
FIG. 4 illustrates a process by which the NVRAM is dynamically allocated between the data cache and MD tree structure in response to system requirements in accordance with one embodiment.

FIG. 4 illustrates a process by which the NVRAM is dynamically allocated between the data cache and MD tree structure in response to system requirements in accordance with one embodiment. Process 400 begins at operation 405 in which system requirements and data access patterns are analyzed. Such requirements may include a balancing between MD search time and available NVRAM.

At operation 410, a MD slab size for the MD tree structure is determined based upon the analysis of the system requirements and data access patterns. For example, if the system requirement is relatively short MD search times, then the MD slabs may be made relatively large thus reducing MD search time. will be reduced. However, large MD slabs imply a greater amount of unused MD entries (i.e., wasted NVRAM space). Therefore, if the system requirement is efficient use of NVRAM, then the MD slabs may be made relatively small even though this will lead to longer MD search times and a corresponding increase in the use of processing resources.

Additionally, or alternatively, the data access patterns may be considered at operation 405. For example, analysis of the data access patterns may indicate that only a relatively small amount of data is being accessed regularly. This implies that a small data cache may be sufficient, allowing for larger MD slabs and hence reduced MD search times.

At operation 415, the available NVRAM is dynamically allocated between the MD tree structure and the data cache. Because systems typically have a limited and fixed amount of NVRAM, dynamic allocation allows for more efficient use of the NVRAM.

To further illustrate process 400, the following examples of dynamic allocation of NVRAM are provided for various embodiments of the invention.

For one embodiment, when a new VLU is created, its data access patterns are predicted, perhaps based upon the data access patterns of existing VLUs. The system then chooses an appropriate MD slab size. For example, if the user expects that there is very little spatial locality of reference in the VLU, the user may instruct the system to choose a smaller MD slab size. Once the MD slab size is chosen, it may be kept constant for that entire VLU MD tree structure.

In an alternative embodiment, when a new MD slab is inserted into an existing VLU, the system may use data access patterns to dynamically choose the size of that particular MD slab. For example, if the user observes very little spatial locality of reference for this range of VBAs in the VLU, a smaller MD slab size may be chosen. In such an embodiment, a single VLU MD tree structure may contain MD slabs of varying sizes. This does not create a problem because each MD slab already contains the description of the exact range of VBAs it represents.

In still another embodiment, the system may use data access patterns to dynamically determine the number of MD slabs will be installed in the VLU at any time. For example, in an embodiment in which some of the MD slabs are stored on the disk, as described above, the system determines what portion of the total number of MD slabs are stored on disk and what portion are stored in NVRAM. Additionally, or alternatively, the system may dynamically decide to keep more MD slabs and fewer data slots, or vice versa.

General Matters

Embodiments of the invention may be applied to provide for faster MD searches and more efficient use NVRAM as discussed above and to avoid the drawbacks of conventional MD organization schemes.

A MD search using the MD tree structure in accordance with one embodiment results in improved efficiency as an MD entry need not be reserved for every VBA and there are no conflicts resulting from VBAs mapped to the same MD entry forcing corresponding data blocks from the data cache. Performance is improved over conventional MD searches (e.g., table-walk method), as the number of entries is greatly reduced. Note that some entries may still be 'wasted' because a new slab must be allocated even if only one of the VBAs within the corresponding range is accessed (i.e., the remaining entries may be NULL). However, it is estimated that due to locality of reference, there will be few scenarios where only a very small number of entries within every slab is accessed.

For systems supporting multiple VLUs, an MD tree structure may be initiated for each available VLU. This organization offers the benefits of non-interference between VLUs (i.e., no conflicts for MD entries). Moreover, because the MD store is not statically portioned among the VLUs, the available NVRAM can be utilized efficiently, such that a busy VLU can benefit from using more of the MD store, and if necessary, more of the data cache. In another scenario, a VLU demonstrating a relatively high spatial locality of reference may be allocated relatively more data cache slots, but only a small amount of the MD store, while a relatively less busy VLU may be allocated a greater amount of MD store, but only as many data cache slots as needed.

The invention includes various operations. It will be apparent to those skilled in the art that the operations of the invention may be performed by hardware components or may be embodied in machine-executable instructions, which may be used to cause a general-purpose or special-purpose processor or logic circuits programmed with the instructions to perform the operations. Alternatively, the steps may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks. ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection).

While the invention has been described in terms of several embodiments, those skilled in the art will recognize that the invention is not limited to the embodiments described, but can be practised with modification and alteration within the spirit and scope of the appended claims. The description is thus to be regarded as illustrative instead of limiting.

What is claimed is:

1. A method for operating a data storage system, the method comprising:
    storing data in one or more cache slots of a random access memory of the data storage system;
    storing metadata entries in a tree structure in the random access memory of the data storage system, wherein the metadata tree structure includes a plurality of slabs, each slab comprising a metadata table including a plurality of metadata entries representing a contiguous range of block addresses, each entry including a cache pointer to one of the caches slots storing a data block corresponding to a block address within the contiguous range of block addresses;
    storing a block address range indicator in the metadata table of each slab to indicate the contiguous range of block addresses associated with the metadata entries in the slab; and
    forming the metadata tree structure by storing at least one slab pointer in the metadata table of each slab, each slab pointer pointing to a parent slab or a child slab in the metadata tree structure.

2. The method of claim 1, wherein each entry includes a cache pointer to one of the caches slots storing a data block corresponding to the block address or an indicator to indicate that the corresponding data block is not stored in a cache slot.

3. The method of claim 1, wherein the random access memory is nonvolatile random access memory.

4. The method of claim 1, wherein a slab size is determined based upon system requirements and anticipated data access patterns.

5. The method of claim 1, wherein a slab size for a particular slab is dynamically determined based upon data access patterns for the particular slab.

6. The method of claim 1, wherein the number of slabs is dynamically determined.

7. The method of claim 2, wherein the indicator to indicate that the corresponding data block is not stored in a cache slot is a disk location storing the corresponding data block.

8. The method of claim 7, wherein a portion of the metadata tree structure is stored in a disk memory.

9. The method of claim 8, wherein the portion of the metadata tree structure that is stored in the disk memory is dynamically determined.

10. A method for operating a data storage system, the method comprising:
analyzing system requirements and data access patterns for the data storage system;
storing data in one or more cache slots of a random access memory of the data storage system;
storing metadata entries in a tree structure in the random access memory of the data storage system, wherein the metadata tree structure includes a plurality of slabs, each slab comprising a metadata table including a plurality of metadata entries representing a contiguous range of block addresses, each entry including a cache pointer to one of the caches slots storing a data block corresponding to a block address within the contiguous range of block addresses;
storing a block address range indicator in the metadata table of each slab to indicate the contiguous range of block addresses associated with the metadata entries in the slab;
storing at least one slab pointer in the metadata table of each slab, each slab pointer pointing to a parent slab or a child slab in the metadata tree structure;
determining a number of metadata entries for the metadata table of each slab based upon the system requirements and data access patterns, wherein a portion of available random access memory allocated to the metadata tree structure based upon the number of metadata entries of the plurality of slabs;
dynamically allocating the portion of the random access memory to the metadata tree structure; and
dynamically allocating a remaining amount of the available random access memory to the data cache slots.

11. The method of claim 10, wherein the block addresses of the contiguous ranges are in sequential order within the slab.

12. The method of claim 10, wherein the available random access memory is nonvolatile random access memory.

13. The method of claim 10, wherein each entry includes a cache pointer to one of the caches slots storing a data block corresponding to the block address or an indicator to indicate that the corresponding data block is not stored in a cache slot.

14. The method of claim 13, wherein the indicator to indicate that the corresponding data block is not stored in a cache slot is a disk location storing the corresponding data block.

15. The method of claim 14, wherein a portion of the metadata tree structure is stored in a disk memory.

16. The method of claim 15, wherein the portion of the metadata tree structure that is stored in the disk memory is dynamically determined.

17. A machine-readable storage medium having one or more executable instructions stored thereon, which when executed by a digital processing system, cause the digital processing system to perform a method, the method comprising:
analyzing system requirements and data access patterns for the data storage system;
storing data in one or more cache slots of a random access memory of the data storage system;
storing metadata entries in a tree structure in the random access memory of the data storage system, wherein the metadata tree structure includes a plurality of slabs, each slab comprising a metadata table including a plurality of metadata entries representing a contiguous range of block addresses, each entry including a cache pointer to one of the caches slots storing a data block corresponding to a block address within the contiguous range of block addresses;
storing a block address range indicator in the metadata table of each slab to indicate the contiguous range of block addresses associated with the metadata entries in the slab;
storing at least one slab pointer in the metadata table of each slab, each slab pointer pointing to a parent slab or a child slab in the metadata tree structure;
determining a number of metadata entries for the metadata table of each slab based upon the system requirements and data access patterns, wherein a portion of available random access memory allocated to the metadata tree structure based upon the number of metadata entries of the plurality of slabs;
dynamically allocating the portion of the random access memory to the metadata tree structure; and
dynamically allocating a remaining amount of the available random access memory to the data cache slots.

18. The machine-readable storage medium of claim 17, wherein the block addresses of the contiguous ranges are in sequential order within the slab.

19. The machine-readable storage medium of claim 17, wherein the available random access memory is nonvolatile random access memory.

20. The machine-readable storage medium of claim 18, wherein each entry includes a cache pointer to one of the caches slots storing a data block corresponding to the block address or an indicator to indicate that the corresponding data block is not stored in a cache slot.

21. The machine-readable storage medium of claim 20, wherein the indicator to indicate that the corresponding data block is not stored in a cache slot is a disk location storing the corresponding data block.

22. The machine-readable storage medium of claim 21, wherein a portion of the metadata tree structure is stored in a disk memory.

23. The machine-readable storage medium of claim 22, wherein the portion of the metadata tree structure that is stored in the disk memory is dynamically determined.

24. A data storage system comprising:
a processing system; and
a memory, coupled to the processing system, characterized in that the memory has stored therein instructions which, when executed by the processing system, cause the processing system to:
analyze system requirements and data access patterns for the data storage system;
store data in one or more cache slots of a random access memory of the data storage system;
store metadata entries in a tree structure in the random access memory of the data storage system, wherein the metadata tree structure includes a plurality of slabs, each slab comprising a metadata table including a plurality of metadata entries representing a contiguous range of block addresses, each entry including a cache pointer to one of the caches slots storing a data block corresponding to a block address within the contiguous range of block addresses;

store a block address range indicator in the metadata table of each slab to indicate the contiguous range of block addresses associated with the metadata entries in the slab;

store at least one slab pointer in the metadata table of each slab, each slab pointer pointing to a parent slab or a child slab in the metadata tree structure;

determine a number of metadata entries for the metadata table of each slab based upon the system requirements and data access patterns, wherein a portion of available random access memory allocated to the metadata tree structure based upon the number of metadata entries of the plurality of slabs;

dynamically allocate the portion of the random access memory to the metadata tree structure; and dynamically allocate a remaining amount of the available random access memory to the data cache slots.

25. The data storage system of claim 24, wherein the block addresses of the contiguous ranges are in sequential order within the slab.

26. The data storage system of claim 24, wherein the available random access memory is nonvolatile random access memory.

27. The method of claim 1, wherein the block addresses of the contiguous ranges are in sequential order within the slab.

* * * * *